United States Patent

Amagata

(10) Patent No.: US 12,214,437 B2
(45) Date of Patent: Feb. 4, 2025

(54) SPOT WELDING SYSTEM

(71) Applicant: FANUC CORPORATION, Yamanashi (JP)

(72) Inventor: Yasuhiro Amagata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 163 days.

(21) Appl. No.: 17/069,960

(22) Filed: Oct. 14, 2020

(65) Prior Publication Data

US 2021/0121973 A1 Apr. 29, 2021

(30) Foreign Application Priority Data

Oct. 29, 2019 (JP) ................................. 2019-196087

(51) Int. Cl.
*B23K 11/25* (2006.01)
*B23K 11/11* (2006.01)
*B23K 11/31* (2006.01)

(52) U.S. Cl.
CPC ............. *B23K 11/11* (2013.01); *B23K 11/314* (2013.01)

(58) Field of Classification Search
CPC ..... B23K 11/11; B23K 11/115; B23K 11/314; B23K 11/253; B23K 11/255
See application file for complete search history.

(56) References Cited

U.S. PATENT DOCUMENTS

| | | | | |
|---|---|---|---|---|
| 4,973,813 A | * | 11/1990 | Mitchell | ................ B23K 11/25 219/109 |
| 5,194,709 A | | 3/1993 | Ichikawa et al. | |
| 6,232,572 B1 | * | 5/2001 | Kanjo | .................. B23K 31/125 219/110 |
| 6,278,077 B1 | * | 8/2001 | Cecil | ..................... B23K 11/115 901/42 |
| 9,015,920 B2 | * | 4/2015 | Mauer | .................... B21J 15/025 29/432.1 |

(Continued)

FOREIGN PATENT DOCUMENTS

| CN | 102039480 A | * 5/2011 | ........... B23K 11/115 |
|---|---|---|---|
| CN | 106862742 A | 6/2017 | |

(Continued)

*Primary Examiner* — Thien S Tran
(74) *Attorney, Agent, or Firm* — Studebaker & Brackett PC

(57) ABSTRACT

To provide a spot welding system of high reliability which, when an abnormality such as a spot missing in spot welding occurs, is capable of more precisely and accurately detecting this immediately. Provided are a robot-side system having a robot and a robot-side control unit which controls driving of the robot; and a welder-side system having a welding gun mounted to the robot, and a welder-side control unit, in which the robot-side system includes: a storage unit which stores in advance appropriate thickness information of a welded part of members on which conducting spot welding; a welded-part thickness measurement unit which measures thickness of the welded part of members on which conducting spot welding; and a comparative determination unit which determines quality by comparing thicknesses of a welded part at the time of a welding start command and at the time of a welding completion command, and comparing with the appropriate thickness information of the welded part stored in the storage unit.

2 Claims, 3 Drawing Sheets

(56) References Cited

U.S. PATENT DOCUMENTS

| | | | | |
|---|---|---|---|---|
| 2004/0074877 A1* | 4/2004 | Hochhalter | .......... | B23K 11/314 219/86.41 |
| 2011/0120978 A1* | 5/2011 | Takahashi | ............ | B23K 11/253 219/86.25 |
| 2015/0108100 A1* | 4/2015 | Haeufgloeckner | .. | B23K 31/125 219/109 |
| 2016/0071340 A1* | 3/2016 | Kauth | ....................... | G07C 9/20 340/5.2 |
| 2019/0105729 A1* | 4/2019 | Hatada | ................. | B23K 11/314 |
| 2020/0116767 A1* | 4/2020 | Stolze | .................. | B23K 11/253 |

FOREIGN PATENT DOCUMENTS

| | | | | |
|---|---|---|---|---|
| CN | 109623116 A | | 4/2019 | |
| DE | 4133317 C2 | * | 7/1998 | ........... B23K 11/253 |
| JP | H11-090644 A | | 4/1999 | |
| JP | 2008-213020 A | | 9/2008 | |
| KR | 10-2018-0130173 A | | 12/2018 | |

\* cited by examiner

CHECK OF PLATE THICKNESS REDUCTION AMOUNT BY WELDING
(SUPPLEMENT SPOT MISSING OCCURRED BY FACTOR AHEAD OF ROBOT)

SPOT WELDING SYSTEM

This application is based on and claims the benefit of priority from Japanese Patent Application No. 2019-196087, filed on 29 Oct. 2019, the content of which is incorporated herein by reference.

BACKGROUND OF THE INVENTION

Field of the Invention

The present invention relates to a spot welding system.

Related Art

Due to having the many advantages of being able to realize a weight reduction compared to rivet welding, and the welding time being short and production efficiency being good, for example, spot welding is widely used as a joining method of metal components in many industries and technical fields, such as in the joining process of automobile bodies.

Spot welding (point welding, resistance welding) is a type of electrical resistance welding, and joins by bringing together two metal members by superimposing or the like, then energizing with a large electrical current while pressing the welded part with copper alloy electrodes of round rod shape, thereby heating the metal material of contacting parts by the electrical resistance to locally fuse together.

In addition, a production line of a joining process of automobile bodies or the like, spot welding systems are being used which are equipped with a robot, and a spot welder (spot welding device) having a spot welding gun (electrode rods) which is servomotor driven mounted and supported by an arm of the robot, a welding timer (control device), etc.

On the other hand, with a system performing spot welding, there are cases where an abnormality occurs such as so-called spot missing (weld missing, not energized) in spot welding, and failure of the welder due to an unexpected situation, and if such an abnormality in spot welding occurs, it will naturally affect the quality of the product.

For this reason, the development of a mechanism/system such that immediately notices when an abnormality such as spot missing in spot welding occurred for some reason.

Incidentally, a conventional spot welding system is made using a spot welding gun which is servomotor driven to be able to finely set the welding pressure, and has little spatter during welding, which makes it difficult to immediately notice an abnormality during production by simply looking from outside.

To address this, Patent Document 1 discloses "a proper welding spot judgment method for a spot welding robot which is a control method of a spot welding robot provided with a welding machine body equipped with a moving means that is mobile to a predetermined location, and energizes after moving the welding machine body to the predetermined location to perform spot welding on every vehicle type, wherein the robot includes a count means which inputs welding completion information of performing welding outputted by the welding machine body, and counts the welding spot number; a welding work end determination means which determines whether having ended one cycle of a welding process of performing a spot welding process in which the spot welding robot energizes to perform spot welding with a plurality of number of times decided in advance defined as one cycle; and a proper welding end determination means for determining whether the spot welding spot number of the one cycle welding process decided in advance and the welding spot number counted by the count means match, the method comprising counting the welding spot number by way of the count means until the welding work end determination means determines to end one cycle welding process, and determining whether the one cycle welding process ended normally by the proper welding end determination means after the end of the one cycle welding process."

Patent Document 1: Japanese Unexamined Patent Application, Publication No. 2008-213020

SUMMARY OF THE INVENTION

With the above-mentioned conventional proper welding spot judgment method for a spot welding robot, it simply judges the appropriateness of a spot welding process by whether the design welding spot number set in advance, and an actual welding spot number counted by the count means are matching.

In this case, first, it is not possible to grasp at which spot of one cycle an abnormality such as spot missing is occurring. For this reason, during re-welding after recovery, work for discovering and specifying the abnormality location is necessary, and thus comes to require a great deal of effort and time.

In addition, since a case of being counted irrespective of welding not being performed properly can also arise, there is concern over not being able to correctly detect abnormality such as spot missing in spot welding.

Herein, with a system combining a robot which performs spot welding and a welding timer (control device), there are cases where the main cause for an abnormality such as spot missing occurring is not on the robot side, but rather is an abnormality in processing such as of a PLC (programmable logic controller) placed between the robot and the welding timer. In other words, when looking from the robot, there are cases where an abnormality such as spot missing occurring irrespective of the welding start command being correctly outputted and the welding completion command (welding completion signal) also being correctly received.

In contrast, with the above-mentioned conventional proper welding spot judgment method for a spot welding robot, it counts the driving on the welder side, and judges the appropriateness of the spot welding process. For this reason, in the case of an abnormality in the welder, an abnormality in the processing of the PLC between the welder and robot, or the like occurring, it is still not possible to properly judge.

Therefore, a high reliability mechanism/system has been strongly desired which, when an abnormality such as spot missing in spot welding has occurred, is capable of precisely and correctly detecting this immediately.

An aspect of a spot welding system of the present disclosure is configured to include: a robot-side system having a robot and a robot-side control unit which controls driving of the robot; and a welder-side system having a welding gun mounted to the robot, and a welder-side control unit, in which the robot-side system includes: a storage unit which stores in advance appropriate thickness information of a welded part of members on which conducting spot welding; a welded-part thickness measurement unit which measures thickness of the welded part of members on which conducting spot welding; and a comparative determination unit which determines quality by comparing thicknesses of a welded part at the time of a welding start command and at the time of a welding completion command, and comparing with the appropriate thickness information of the welded part stored in the storage unit.

In the aspect of the spot welding system of the present disclosure, even in a case of a sequence operating normally on the robot side, and an abnormality such as spot missing occurring by a problem arising thereafter, it is possible to reliably detect an abnormality.

In addition, due to detecting unwelded locations (abnormality) in spot welding operation at one location or a plurality of spot welding operations, i.e. at a spot site or one set, it becomes possible to specify a location at which an abnormality occurred easily during recovery and perform re-welding.

Consequently according to the aspect of the spot welding system of the present disclosure, when an abnormality such as a spot missing in spot welding occurs, it is possible to realize a spot welding system of high reliability capable of more precisely and accurately detecting this quickly. It is thereby possible to prevent the quality of the product from being affected so long as an abnormality such as spot missing of the spot welding being detected, and thus it becomes possible to provide higher reliability products, and achieve an improvement in manufacturing yield.

DETAILED DESCRIPTION OF THE INVENTION

Hereinafter, a spot welding system according to an embodiment will be explained referencing FIGS. 1 to 3.

Figure 1:
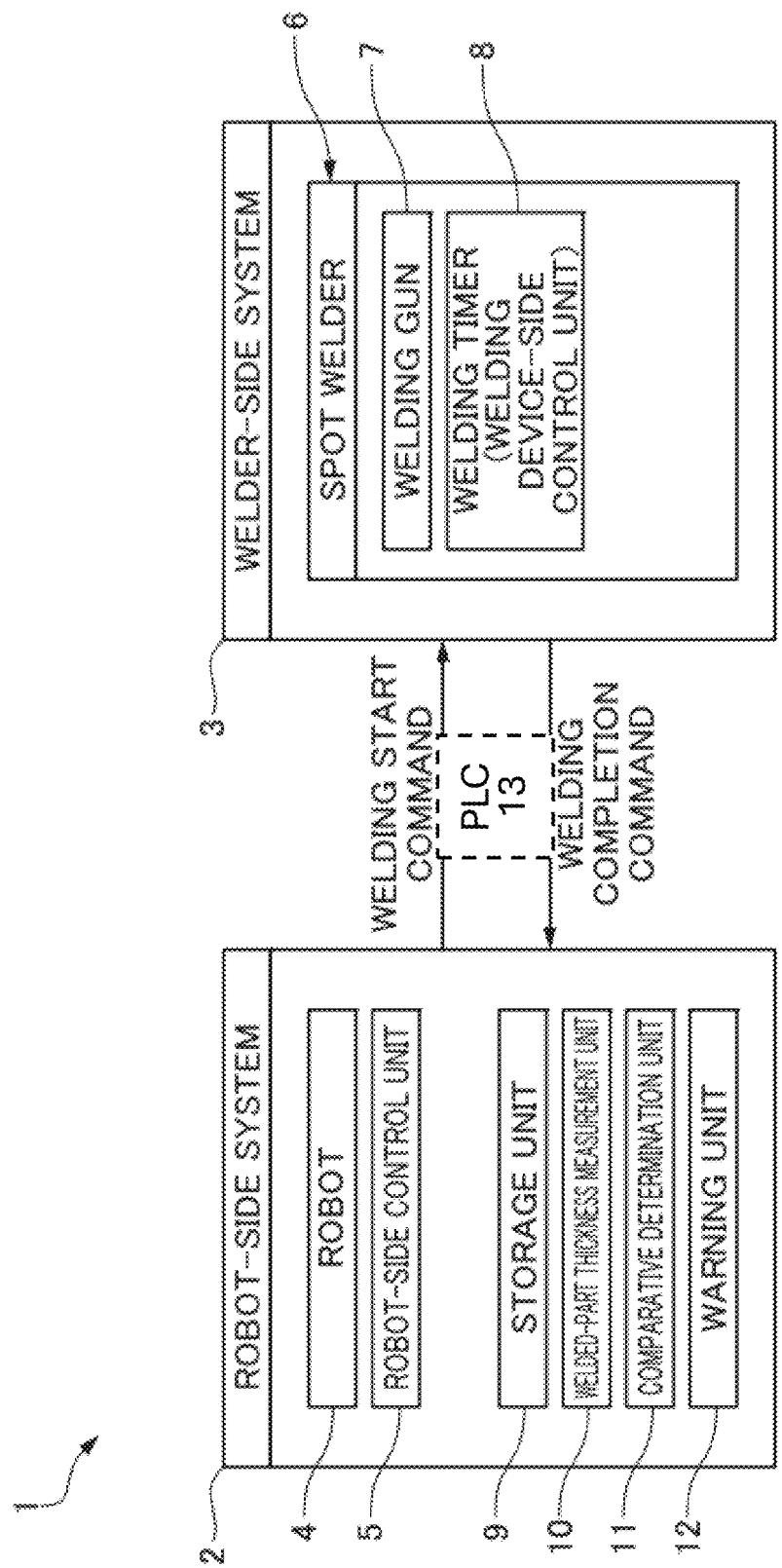
FIG. 1 is a block diagram showing a spot welding system of one embodiment.
Figure 2:
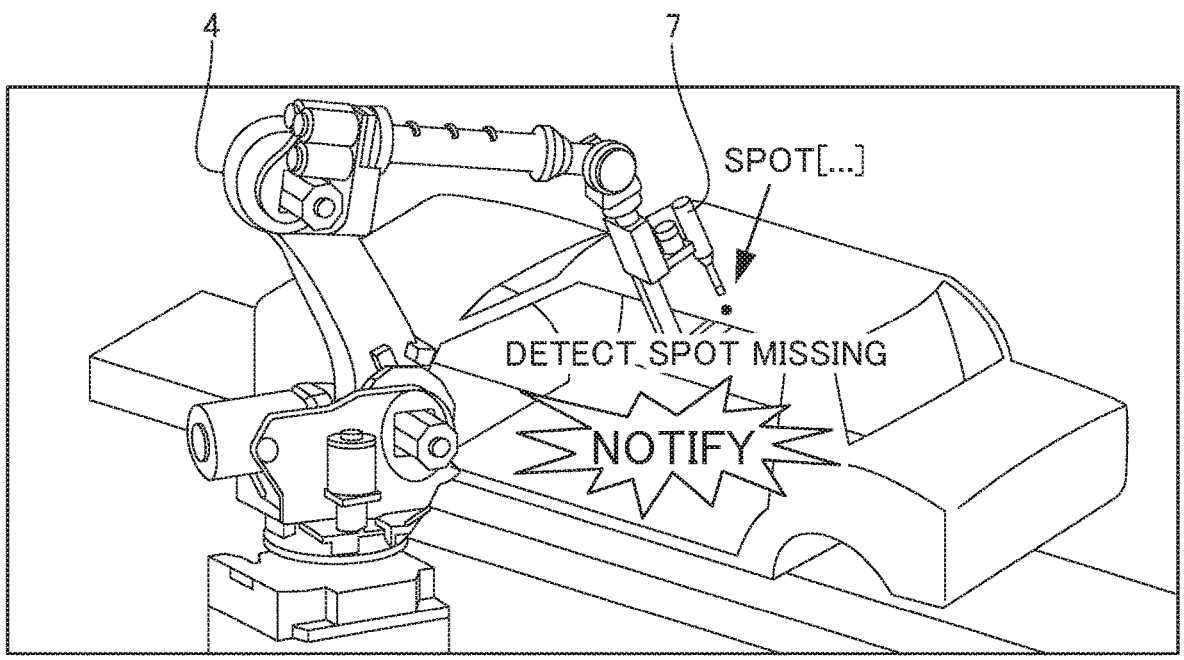
FIG. 2 is a view showing a state of performing spot welding operation by a spot welding system of one embodiment.

A spot welding system 1 of the present embodiment, as shown in FIGS. 1 and 2, for example, is a system installed in a production line and is for conducting resistance spot welding on a work target such as an automobile body, and is configured to include: a spot welder (welding device) 6 consisting of a welding gun 7 equipped with electrode rods, a welding timer (welder-side control unit) 8 which controls the operation times required in a series of operations (sequence) performing welding such as the time for which flowing welding current and magnitude of electrical current, pressing time (squeeze time), heating time, retaining time (hold time), cooling time (cool time), etc.; an articulated robot 4 which mounts and retains the welding gun 7 that is servomotor controlled, etc. to an arm; and a robot-side control device (robot-side control unit) 5 which controls driving of the robot 4.

In the spot welding system 1, the robot 4 and a robot-side system 2 of a robot-side control unit 5, and a welder-side system 3 are configured so that the welding start command (welding start signal) outputted from the robot-side system 2 is sent directly to the welder-side system 3, and the welding completion command (welding completion signal) is sent directly from the welder-side system 3 to the robot-side system 2.

Alternatively, the spot welding system 1 is configured so that a welding start command outputted from the robot-side system 2 is sent to a PLC 13, and sent to the welder-side system 3 by conducting the appropriate processing by the PLC 13, a welding completion command is sent from the welder-side system 3 to the PLC 13 to conduct the appropriate processing by the PLC 13, and then sent to the robot-side system 2.

On the other hand, the spot welding system 1 of the present embodiment includes, on the robot-side system 2 such as the robot-side control device 5, a storage unit 9 which stores in advance the thickness information of a welded part (spot) of members (plurality of members) on which conducting spot welding in the case of proper spot welding being performed; a welded-part thickness measurement unit 10 which measures the thickness of the welded part (spot) of the members (plurality of members) on which conducting spot welding; a comparative determination unit 11 which determines quality (appropriateness, existence/absence of abnormality) by comparing the thickness of the welded part at the time of the welding start command and at the time of the welding completion command, and comparing the thickness information stored in the storage unit 9 of the welded part upon proper welding being performed; and a warning unit 12 which issues an alarm or the like in the case of being determined as inappropriate by the comparative determination unit 11.

Figure 3:
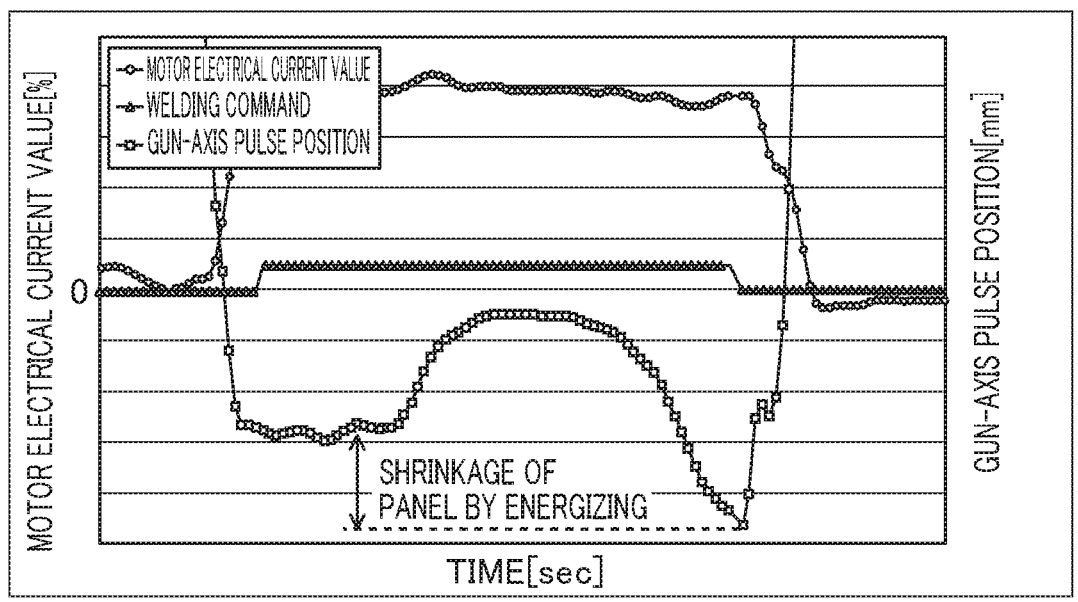
FIG. 3 is a view showing a detection example of the thickness of a welded part by the spot welding system of one embodiment.

Then, in the spot welding system 1 of the present embodiment configured as described above, when the pair of electrode rods of the welding gun 7 are arranged so as to sandwich the welded part of the welding target in a state overlapping a plurality of members on which to conduct spot welding as shown in FIG. 3, pressure is applied, and a decrease in the thickness of the welded part receiving this pressure is detected by the welded part thickness measurement unit 10.

Next, when the welding start command is outputted to the welding timer 8, or PLC and welding timer 8, from the control device 5 of the robot-side system 2, a predetermined electrical current flows to the welded part of the welding target from the electrode rods of the welding gun 7 according to the welding timer 8 receiving this, and the welded part of the welding target generates heat by the high current flowed, thereby melting.

At this time, the welding part swells by the heat generation, and the increase in thickness of the welded part is detected by the welded part thickness measurement unit 10.

The welded part of the welding target generates heat and melts by the high current flowed, and at a stage when a predetermined time and predetermined electrical current has flowed, the welding completion command is sent from the welding timer 8 to the control device 5 of the robot-side system 2, or PLC and control device 5. At a stage when the welded part of this welding target has melted and fused, then gradually cools, the welded part shrinks, and the decrease in thickness of the welded part is detected by the welded part thickness measurement unit 10.

With the spot welding system 1 of the present embodiment, the thicknesses at the time of the welding start command of the welded part which is the welding target upon a predetermined electrical current being flowed for a predetermined time are stored in the storage unit 9, and at a stage of performing spot welding as described above, the comparative determination unit 11 compares the thickness (finite difference) of the welded part at the time of the welding start command and at the time of the welding completion command stored in the storage unit 9, and the thickness (finite difference) of the welded part at the time of the welding start command and at the time of the welding completion command measured by the welded-part thickness measurement unit 10, whereby it is confirmed whether the difference between the setting thickness (finite difference) of these welded parts and the measured thickness (finite difference) is within a permitted range.

Then, in the case of the difference between the set thickness (finite difference) of the welded part and the measured thickness (finite difference) being within a permitted range, it is determined that the spot welding was properly performed, and in the case of not being within the permitted range, it is determined as having some defects, i.e. abnormalities, such as spot missing and welder failure.

In addition, with the present embodiment, in the case of an abnormality being detected in this way, an alarm or the like is notified externally from the warning unit 12, whereby it is possible to make the operator or the like recognize early and reliably that an abnormality is occurring.

Therefore, in the spot welding system 1 of the present embodiment, by grasping the change in the thickness of the welded part of the welding target upon performing spot welding by flowing a predetermined electrical current for a predetermined time, it is possible to determine and judge the existence/absence of abnormalities such as spot missing and welder failure. Even in a case of the sequence operating normally on the robot side, and a problem arising and abnormality such as spot missing occurring after that, it is possible to reliably detect the abnormality.

In the spot welding system 1 of the present embodiment, it is possible to judge the existence/absence of abnormality by measuring the welding time (or every one set of a plurality of welded parts (spots)) for every one welded part (spot). Since it is thereby possible to easily specify a welded part in which an abnormality occurred, it becomes possible to perform re-welding work and handle easily by performing recovery, etc.

In the case of putting together a plurality of welded parts such as one se, and judging the existence/absence of abnormality by measuring the overall welding time, along with performing the welding work of this plurality of welded parts, it becomes possible to achieve both streamlining of the welding work, and ease in specifying of the abnormality location by appropriately setting the number of welded parts.

Consequently, according to the spot welding system 1 of the present embodiment, when an abnormality such as a spot missing in spot welding occurs, it is possible to realize a spot welding system of high reliability capable of more precisely and accurately detecting this quickly. It is thereby possible to prevent the quality of the product from being affected so long as spot missing, etc. of the spot welding being detected, and thus it becomes possible to provide higher reliability products, and achieve an improvement in manufacturing yield.

In addition, in the spot welding system 1 of the present embodiment, even in a case of a PLC being interposed between the robot-side system 2 and welder-side system 3, it is possible to catch anomalies by the robot-side system 2.

Although an embodiment of a spot welding system has been explained above, the present invention is not to be limited to the above-mentioned embodiment, and modifications are possible where appropriate within a scope not departing from the gist thereof.

EXPLANATION OF REFERENCE NUMERALS 1 spot welding system
2 robot-side system
3 welder-side system
4 robot
5 robot-side control unit
6 spot welder
7 welding gun
8 welding timer (welder-side control unit)
9 storage unit
10 welded-part thickness measurement unit
11 comparative determination unit
12 warning unit

What is claimed is:

1. A spot welding system comprising:
a robot-side system having a robot and a robot-side controller; and
a welder-side system having a welding gun mounted to the robot, and a welder-side controller,
wherein the robot-side system includes:
a storage, the storage configured to store in advance appropriate thickness information regarding a difference between a thickness of a welded part at a time of welding start and a thickness of the welded part at a time of welding completion in spot welding;
a welded-part thickness measurement unit that measures thicknesses of the welded part for the spot welding based on positions of electrode rods of the spot welding system that sandwich the welded part at a time of a welding start command and at a time of a welding completion command; and
a comparative determination unit that determines quality of the welding by comparing thicknesses of the welded part at a time of a welding start command and at a time of a welding completion command, and comparing a difference between the measured thickness at the time of the welding start command and the measured thickness at the time of the welding completion command with the stored appropriate thickness information of the welded part, and
wherein the spot welding system puts together a plurality of welded parts into one set, performs welding work of the plurality of welded parts, and measures overall welding time of the plurality of welded parts of the set to judge existence/absence of abnormality.

2. The spot welding system according to claim 1, wherein a PLC is interposed between the robot-side system and the welder-side system.

* * * * *